2,837,533
NEW QUATERNARY AMINO ETHERS AND A PROCESS FOR THEIR PREPARATION

Diran Melkonian and Philippe Gold, Geneva, Switzerland, assignors to Laboratoire Sapos, Geneva, Switzerland, a Swiss company, and Edouard Frommel, Geneva, Switzerland No Drawing. Application May 14, 1956
Serial No. 584,447
Claims priority, application Switzerland January 26, 1954

3 Claims. (Cl. 260—326.5)

This invention relates to novel quaternary amino-ethers and to processes for the preparation thereof.

We have found that quaternary amino-ethers of the general formula

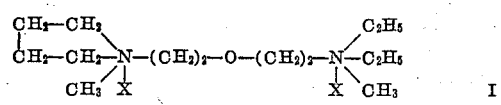
                                                               I in which X is an anion, preferably a halogen atom, possess a marked ganglionic blocking activity and are therefore of pharmaceutical value.

In accordance with the present invention, therefore, we provide as new compounds, the quaternary amino-ethers of general Formula I above.

A preferred compound within the above general formula is that in which X is an iodine atom, namely N-diethylmethyl-ammonium - ethoxy-ethyl-N'-methyl-pyrrolidine-N,N'-diiodide. This compound is a white, crystalline substance, very soluble in water, sparingly soluble in cold alcohol, insoluble in ether and very sparingly soluble in benzene; when heated to 250° C. it neither melts nor decomposes.

The following table shows the toxicity of this new compound, as shown by the LD50 in mice on a single injection as compared with that of two known hypotensive agents, namely hexamethonium and pendiomide. (The latter being diethylenetriamine,N,N,N',N'',N''-pentamethyl-1:5-diethobromide.)

TABLE I
LD50 on single injection in mice: mg./kg.

| | Sub-cutaneous | Intra-peritoneal | Intra-venous |
|---|---|---|---|
| New compound | 143 | 140 | 34 |
| Hexamethonium | 144 | 160 | 37 |
| Pendiomide | 148 | 180 | 54 |

Extensive tests have been carried out on animals with this new compound and it has been shown that its toxicity is low in comparison with its hypotensive activity (rabbit, guinea-pig and mouse). The margin of safety of this new compound, as compared with the known hypotensive agents referred to above, is illustrated in the following table.

TABLE II
Hypotensive activity/rabbit—Toxicity/mouse

| | Dose in mg./kg. (I. V.) causing 30% hypotension, rabbit | LD30 (I. V.) mg./kg., mouse | Safety index | Dose in mg./kg. (I. V.) causing 50% hypotension, rabbit | LD50 (I. V.) mg./kg. mouse | Safety index |
|---|---|---|---|---|---|---|
| New compound | 0.88 | 26 | 29.5 | 1.84 | 34 | 17.9 |
| Hexamethonium | 2.84 | 32.5 | 11.4 | 5.1 | 37 | 7 |
| Pendiomide | 2.08 | 45 | 21.6 | 5.2 | 54 | 10.6 |

These figures show that the new compound is a most active ganglionic blocking agent, judged by the hypotensive effect, and possesses a broader margin of safety than the known compounds.

Further tests have shown that the hypotension produced by intravenous and subcutaneous injection is not instantaneous, but gradual and of long duration (rabbit, dog). The compound can be absorbed orally and by suppositories (rabbit and dog).

The blocking effect of this compound on sympathetic ganglia is manifested by the temporary disappearance of the hypertensive reflex of the occlusio carotidis primitivae, by the inhibition of the hypertensive effect due to intravenous injection of acetylcholine given to an animal previously treated with atropine, by the increased hypertensive action of an intravenous injection of adrenaline, and by the antagonistic action against nicotinic poisoning (mouse, rabbit, dog).

The blocking effect on parasympathetic ganglia is manifested by the disappearance of bradycardia at the peak of the epineptrine hypertension, by the protective effect against acetylcholine asthma (guinea pig). The new compound has no significant influence on the respiratory centre (rabbit, dog), and none on the vomiting centre (apomorphine, dog). It has no protective influence on the animal under electro-shock or cardiazol-shock, nor against strychnine poisoning (mouse).

We have further found that the compounds of Formula I above can be prepared by reacting an amino-alkoxide of the general formula

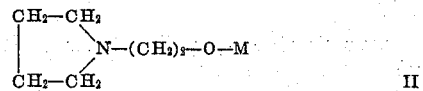
                                                  II in which M is an alkali metal, at elevated temperature with a diethylamino ethyl halide of the general formula

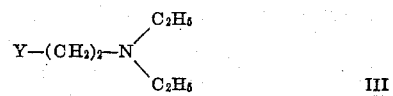
                                                 III in which Y is a halogen atom, to form the tertiary amino-ether of the formula

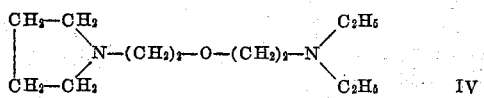
                                               IV which is then quaternized with approximately two molecular proportions of a methyl halide $CH_3X$, where X has the above stated meaning.

According to a feature of the present invention, therefore, we provide a process for the preparation of the quaternary amino-ethers of Formula I in which an amino-alkoxide of the Formula II is reacted at elevated temperature with a diethylaminoethyl halide of Formula III and the tertiary amino-ether obtained is quaternized with approximately two molecular proportions of a methyl halide.

The diethylaminoethyl halide of Formula III used in the process according to the invention is advantageously freshly prepared for the reaction, as it tends to cyclise on storage and thereby lose its reactive properties; we prefer to use the chloride of Formula III in this reaction.

The amino-alkoxide of Formula II is advantageously prepared by adding an alkali metal, preferably sodium, to the corresponding amino-alcohol, with the latter in stoichoimetric excess, at room temperature. For example, one mol of sodium may be added to two mols of the amino-alcohol, and the mixture then heated under reflux, if necessary to accelerate the reaction, which is continued until the sodium is entirely reacted with the amino-alcohol. When the reaction is completed, the excess amino-alcohol is removed, for example by distillation in vacuo, leaving a thick brown residue consisting of the sodium salt of the amino-alcohol.

In carrying out the process according to the invention, we prefer to proceed by adding one mol of the freshly prepared and distilled diethylaminoethyl halide to the brown residue described above. Reaction will, in general, only start when the reaction mixture has been heated and suitable temperatures for the reaction are, for example, within the range 150–250° C. The product obtained is then taken up in, for example, methanol and the alkali metal halide formed is filtered off. An excess of the methyl halide is then added to the filtrate. After heating for some time, for example at the boiling point of the mixture under reflux, a crystalline precipitate of the desired quaternary amino-ether dihalide separates out at room temperature.

In order that the invention may be well understood, the following example is given by way of illustration only:

Two mols of beta-pyrrolidinoethanol were heated under reflux with one mol of metallic sodium. The reaction was only brisk under reflux and took some time. When the sodium had been reacted, excess beta-pyrrolidinoethanol was evaporated by distillation under reduced pressure leaving a brown residue of sodium beta-pyrrolidinoethoxide.

One mol of diethylaminoethyl chloride (freshly distilled under normal pressure, B. P. 143–144° C.), was added to this residue and the mixture heated to about 150° C. (at which temperature the reaction started) and then to about 198–200° C. Heating was then stopped and the reaction proceeded spontaneously. Sodium chloride separated off rather rapidly and the reaction was then completed.

After cooling, the product was taken up in methanol and sodium chloride filtered off. Excess methyl iodide was added to the methanolic filtrate and the mixture was heated under reflux for about 1 hour; a crystalline precipitate of the diiodide of N-diethylmethyl-ammonium-ethoxyethyl-N'-methylpyrrolidine then separated off. If too much alcohol is used, no precipitate is at first observed, but after 24 hours in a refrigerator the desired diquaternary compound is obtained in a well-defined crystalline form, and can be taken up in an appropriate solvent.

N-diethylmethyl-ammonium-ethoxyethyl-N'-methyl-pyrrolidine-N,N'-diiodide obtained in this manner was a white crystalline solid which neither melted nor decomposed when heated to 250° C. It was very soluble in water, sparingly soluble in cold alcohol, insoluble in ether and very sparingly soluble in benzene.

As indicated above, the diethylaminoethyl halide of Formula III used as starting material in the process of the invention tends to cyclise on storage and thereby lose its reactive properties. Further, for the preparation of the amino-alkoxide of Formula II, an alkali metal, preferably sodium, is dissolved in the corresponding amino-alcohol; such an operation is always dangerous, difficult to carry out on an industrial scale and time-spending.

For avoiding these disadvantages, the present invention further provides a simpler, commercial process for the preparation of the quaternary amino-ethers of Formula I. This process comprises only two steps which render it economical.

This further process comprises firstly reacting beta-pyrrolidinoethanol with a halogenohydrate of diethyl-amino-ethyl-halide into an anhydrous medium and in the presence of sodium amide, and secondly combining one molecule of the so obtained tertiary amino-ether with two molecules of $CH_3X$, X having the same meaning as in Formula I.

The reaction between the beta-pyrrolidinoethanol and the halogenohydrate of a diethylamino-ethyl-halide may advantageously be effected in the presence of an anhydrous organic solvent, for instance benzene.

The chemical equations of the two steps of this other process of the invention are as follows: in the formulae X stands for chlorine, bromine or iodine and Ha a halogen which is not necessarily the same as X.

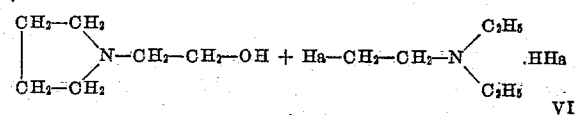

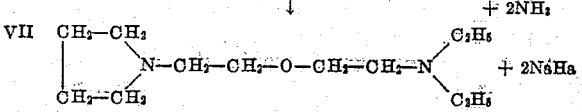

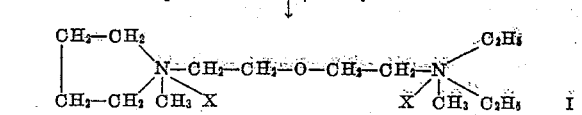

In order that the commercial process according to the invention may be well understood, the following example is given by way of illustration only. This example corresponds to the above equations in which Ha is chlorine and X iodine.

EXAMPLE

*First step:* 600 g. of beta-pyrrolidinoethanol, 5 litres anhydrous benzene, 400 g. finely ground sodium amide, and 800 g. dry chlorhydrate of diethylamino-ethyl-halide are introduced into a 15 to 20 l. three-necked flask associated with a stirrer, a cooler and a funnel. The sodium amide and the dry chlorhydrate are gradually added to the two other compounds.

When the total quantities of the ingredients are introduced into the flask, heating is started under vigorous stirring. The heating is maintained during a few hours and as long as ammonia evolves at the top of the cooler. The contents of the flask is then left standing for one night at normal temperature and the salts formed are eliminated as well as the excess of amide, by filtration by vacuo. A brown solution of the tertiary base in benzene is thus obtained.

*Second step:* In the same flask as before, cleaned and dried first, the solution of tertiary base is introduced, then 2 kg. of methyl iodide are added under vigorous stirring and efficient cooling by means of the cooler.

When all the methyl iodide has been added, the contents of the flask are heated under reflux for several hours and afterwards left to cool and to crystallize, the temperature being lowered down to the neighborhood of 5° C. The product is then filtered and dried, after which it is recrystallized as follows:

The product is dissolved in denatured alcohol at boiling point, then left to cool and crystallize; it is filtered in vacuo; the crystals are washed in acetone and dried. Generally one or two recrystallizations are enough.

About 1.7 kg. of N-diethylmethyl-ammonium-ethoxy-ethyl-N'-methyl-pyrrolidine-N,N'-diiodide is obtained.

The various solvents used are recuperated in the usual manner and used again for further operations.

The quaternary amino-ethers of general Formula I indicated at the beginning of the specification in which X is a halogen atom, may be transformed, according to known methods, into other ethers in which X is an acidic group other than halogen, as for instance a phosphoric group. These other ethers are also valuable therapeutic compounds.

Tests conducted on human beings with N-diethylmethly-ammonium-ethoxy-ethyl N'-methyl pyrrolidine-N,N'-diiodide have resulted in the following clinical observations:

This compound is a very efficient hypotensive in relatively small doses, insofar as it is administered by one of the usual means of injection.

The best results are obtained by subcutaneous injections. Intramuscular injections offer no additional advantages, whilst intravenous injections have too drastic effects and are better avoided.

The posology is variable, depending both on the sensitivity of the patient and the mode of administration. It is of the range of 20 mg., which quantity is considered as the optimum dose by subcutaneous injections, or intramuscular.

Doses from 20 to 30 mg. administered subcutaneously bring a very satisfactory drop in pressure, corresponding to about ⅓ of the initial systolitic pressure and ¼ of the diastolic. It occurs within a period of 1 hour to 1½ hours. The hypotensive effect, therefore, is gentle. It lasts several hours, on the average 6 to 8.

Hypertonics suffering from cerebral hemorrhage exhibit a high sensitivity to this medicament.

The N - diethylmethyl - ammonium - ethoxy - ethyl N'-methyl-pyrrolidine-N,N'-diiodide is generally well tolerated. Occasional secondary effects are benign, on condition that the precaution is observed to leave the patients lying down as soon as the injection is made and during the maximum hypotension phase.

The N - diethylmethyl - ammonium - ethoxy - ethyl N'-methyl-pyrrolidine-N,N'-diiodide is a new ganglioplegic, capable of being highly useful to the clinician who wants to prescribe a powerful, yet not rough hypotensive, the clinical indications of which can be superposed to those of methoniums.

This application is a continuation-in-part of application Ser. No. 483,442, now abandoned.

What we claim is:
1. The quaternary amino-ethers of the general formula

$$\begin{array}{c}CH_2-CH_2\\ |\qquad\quad\backslash\\ CH_2-CH_2-N-(CH_2)_2-O-(CH_2)_2-N-C_2H_5\\ \quad\;/\;\;|\qquad\qquad\qquad\qquad\quad|\;\;\backslash\\ CH_3\;\;X\qquad\qquad\qquad\qquad X\;\;CH_3\end{array}$$

in which X is a halogen atom from the group consisting of chlorine, bromine and iodine atoms.

2. The compound consisting of diiodide of N-diethyl-methyl-ammonium-ethoxyethyl-N'-methyl-pyrrolidine.

3. A process for the preparation of the quaternary amino-ethers of the general formula $$\begin{array}{c}CH_2-CH_2\\ |\qquad\quad\backslash\\ CH_2-CH_2-N-(CH_2)_2-O-(CH_2)_2-N-C_2H_5\\ \quad\;/\;\;|\qquad\qquad\qquad\qquad\quad|\;\;\backslash\\ CH_3\;\;X\qquad\qquad\qquad\qquad X\;\;CH_3\end{array}$$

in which X is a halogen atom, which comprises firstly reacting beta-pyrrolidinoethanol with a hydrohalide of diethylamino-ethyl-halide in an anhydrous medium and in the presence of sodium amide, and secondly quaternizing one molecule of the so obtained tertiary amino-ether with two molecules of $CH_3X$, X having the same meaning as in the above formula, the reaction between the beta-pyrrolidinoethanol and the hydrohalide of a diethyl-amino-ethyl-halide being effected in the presence of an anhydrous organic solvent.

References Cited in the file of this patent

UNITED STATES PATENTS 2,708,207    Girod _____ May 10, 1955

FOREIGN PATENTS 511,219    Belgium _____ May 31, 1952

OTHER REFERENCES

Levis et al.: Arch. Intern. Pharmacodynamie, vol. 93, pp. 46–54 (1953).

Morrison: Arch. Nitern. Pharmacodynamie, vol. 86, pp. 203–213 (1951).

Ewins: Biochem. J., vol. 8, pp. 367–9 (1914).

Kahaue et al.: Bull. Soc. Chim. France, vol. 6, pp. 647–8 (1939).

Paley: Compt. rendus Soc. Biol., vol. 140, p. 86 (1946).

Kunkel et al.: Federation Proc., vol. 11, p. 365 (March 1952).

Fakstorp et al.: Acta Chemica Scand., vol. 7, pp. 134–9 (1953).